July 26, 1966     S. H. HINE     3,263,070
APPARATUS FOR PRODUCING A SOURCE OF LIGHT OF REDUCED SIZE
Filed Sept. 10, 1963     3 Sheets-Sheet 1
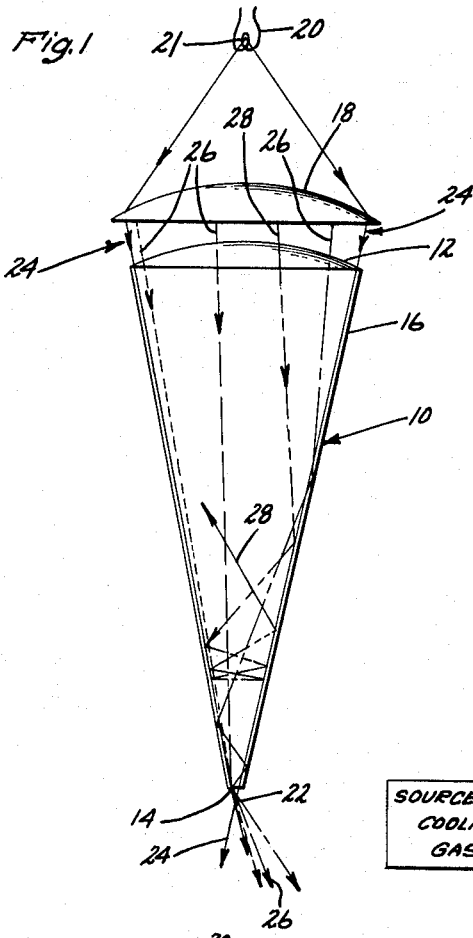
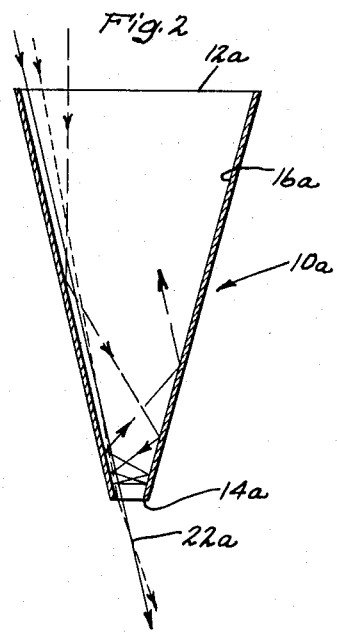
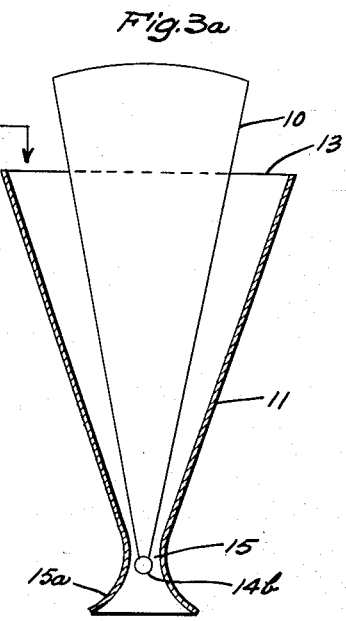
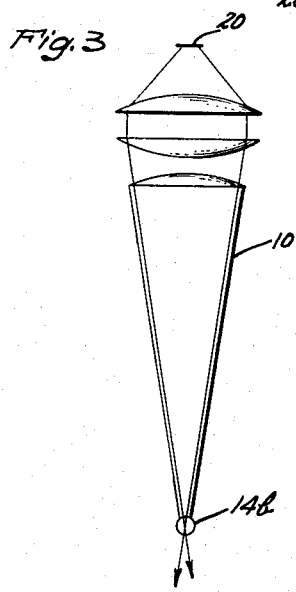
INVENTOR.
Sheldon H. Hine,
BY Hood, Gust & Irish
Attorneys.

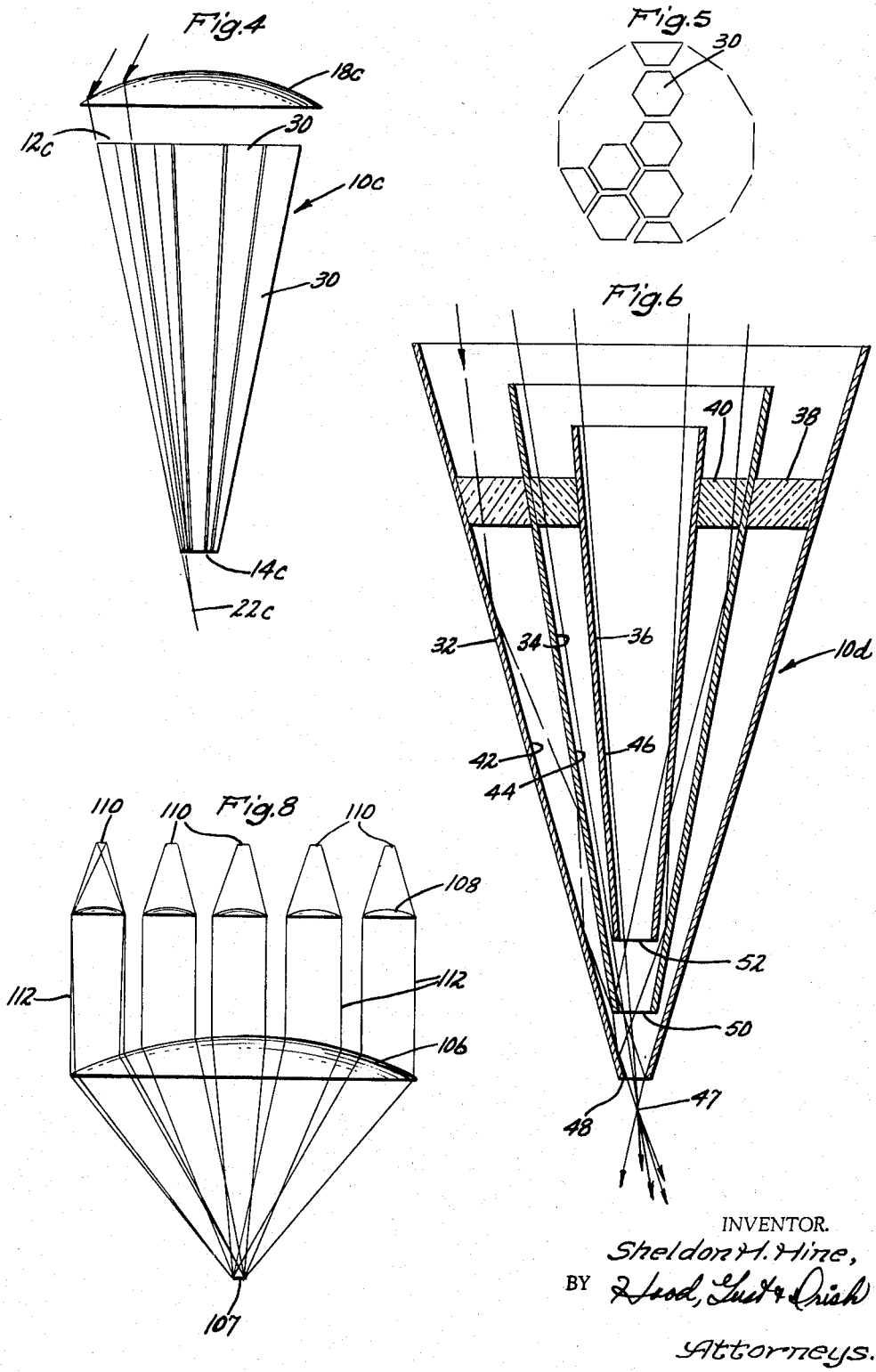

July 26, 1966  S. H. HINE  3,263,070
APPARATUS FOR PRODUCING A SOURCE OF LIGHT OF REDUCED SIZE
Filed Sept. 10, 1963  3 Sheets-Sheet 3
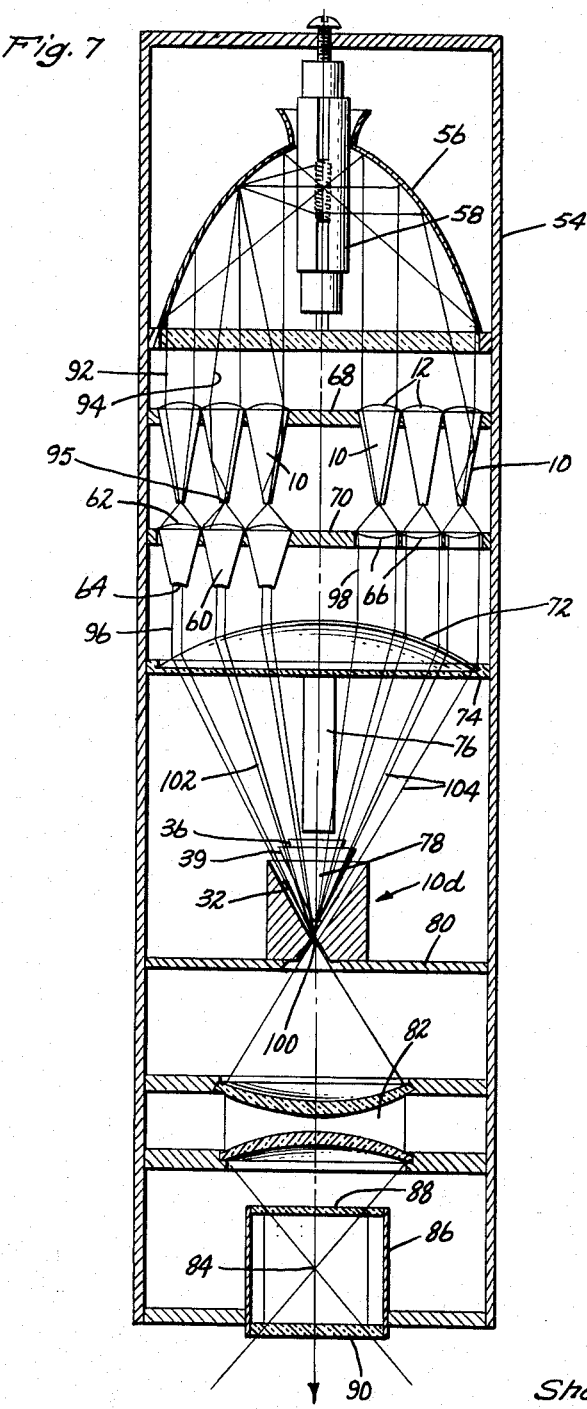
INVENTOR.
Sheldon H. Hine,
BY Hood, Gust & Irish
Attorneys.

United States Patent Office 3,263,070
Patented July 26, 1966

3,263,070
APPARATUS FOR PRODUCING A SOURCE OF LIGHT OF REDUCED SIZE
Sheldon H. Hine, 3232 Clinton Court, Fort Wayne, Ind.
Filed Sept. 10, 1963, Ser. No. 307,889
12 Claims. (Cl. 240—47)

The present invention relates to an apparatus for producing a source of light of reduced size and more particularly to apparatus for reducing the optical size of a source of radiant energy.

Optical control of light is a science of geometry and the principles of control can be effectively illustrated by means of simple geometric drawings. In such drawings, the light source is usually denoted by a dot or point with rays emanating therefrom. Lenses used in conjunction with such a dot source can be shown to form perfectly collimated beams or to image the source to a dot size, depending upon the lens configuration used. If, as is true in practice, the source is increased in size, geometric lines and figures emanating therefrom become random, lose direction, precision and control. Thus, there can be no precision geometry without a true point of origin, as is well known. This same condition prevails in practice wherein perfect control of light has not heretofore been achieved; however, the more nearly the source of light can be made to approach a true point, the more precise can be control by known optical means.

In the present invention, the problems of control inherent in the relatively large area sources are substantially overcome by reducing the effective size of the real source to a degree which approaches a point or dot. The reduced source thereby can be utilized by known optical systems to form collimated beams and image sources which approach perfection.

It is therefore an object of this invention to provide an apparatus for reducing the optical size of a source or radiant energy.

It is another object to provide apparatus for superimposing source images whereby energy densities of increased levels can be obtained.

It is still another object of this invention to provide apparatus for directing imperfect rays of an optical system into coherence with more perfect rays to form a virtual energy source of point-like size.

The above-mentioned and other features and objects of this invention and the manner of attaining them will become more apparent and the invention itself will be best understood by reference to the following description of embodiments of the invention taken in conjunction with the accompanying drawings, wherein:

FIG. 1 is a side view of one embodiment of this invention;

FIG. 2 is a longitudinal sectional view of another embodiment of this invention;

FIG. 3 is a side view of a slightly modified, further embodiment of this invention;

FIG. 3d is a side view, partially sectioned, of an assembly for cooling a conical compressing element;

FIG. 4 is a side view of a cone assembly constituting still a further embodiment of this invention;

FIG. 5 is a top plan view of the arrangement of FIG. 4;

FIG. 6 is a longitudinal sectional view of still another embodiment of this invention;

FIG. 7 is a longitudinal sectional view of an assembly embodiment of this invention; and FIG. 8 is a diagrammatic illustration of still another embodiment of this invention.

Referring to the drawings, and more particularly to FIG. 1, a cone shaped member, indicated generally by the numeral 10, is a solid body composed essentially of a medium denser than air having a high index of refraction and of high transparency to rays of wavelengths lying within the visible spectrum. While these specifications are given as exemplary of a specific, operating embodiment of this invention, as will appear obvious from the following description to persons skilled in the art, the material as well as the wavelengths of radiation may be varied without departing from the scope and spirit of this invention. More particularly, and again as a working embodiment of this invention, the member 10 is preferably made of quartz or of heat-resisting glass such as "Pyrex."

This member 10 is cone-shaped and is provided with a convexly curved base 12 and a truncated tip or apex 14. The truncated tip surface preferably is planar perpendicular to the cone axis but may be at a different angle. Further, this truncated tip surface may be curved either inwardly or outwardly depending upon the pattern of radiation desired.

Depending upon design desiderata, the wall of the cone 10 may be surfaced with silver or some other highly reflective material as indicated by the numeral 16.

A conventional optical lens 18 is optically aligned in front of the base surface 12 such that the axis of the lens 18 is coincident with the axis of the cone 10. In front of the lens 18 is positioned a suitable light source, such as a filament 20 of a conventional electric lamp. This filament 20 is positioned at the focal point 21 of the lens 18, the lens 18 being positioned with respect to the cone 10 such that the opposite focal point is located at the point indicated by the numeral 22. The diameter of the lens 18 approximates and preferably is slightly larger than the diameter of the base surface 12 for a reason which will become obvious from the following description.

Considering only the optical properties of the lens 18, with the filament 20 located at the lens focal point 21, the same filament as a source will be imaged at the opposite focal point 22. This is in accordance with conventional optical principles. If it is assumed that the cone 10 is absent, the image focused at 22 will be essentially of the same size as the original source 20 and perhaps even larger, depending upon the particular shape and material of the lens 18. In any event, the image will be no smaller than that of the source 20.

With the cone 10 in the position illustrated, the cone or converging bundle of rays, indicated by the numeral 24, which initially originate at the focal point 21 pass through the cone 10 and are focused at the point 22. The cone 10 is made to such dimensions that the light enters the cone at essentially the same converging angle as the sides or wall of the cone. Rays which originate at focal point 21, hereinafter referred to as "perfect rays," cross over at the point 22. Other rays resulting from optical aberrations and the physical size of the filament 20, hereinafter referred to as "imperfect rays," strike the highly reflective sides 16 of the cone, and, by multiple random internal reflection, are literally forced or compressed to a region corresponding to the diameter of the truncated apex 14. The perfect rays which converge to the point 22, as stated previously, are indicated by the numeral 24. Imperfect rays are indicated by the numeral 26, these being forced through the exit 14 in the proximity of the focal point 22. Some rays emanating from the filament 20, such as the ray 28, will strike the side 16 at such a high angle of incidence that after a certain number of reflections will be returned and will never exit from the tip portion 14. As is obvious from the drawing, since the diameter of the tip portion 14 is smaller than the filament source 20, the optical source imaged in the regions surrounding the point 22 will be smaller. The smaller the diameter of the tip portion 14, the smaller will be the size of this imaged source. Thus, the radiation from the source 20 is virtually forced, or in other words compressed, into a smaller area at 22.

As will now be apparent, those perfect rays directed into the cone 10 merely pass through the latter unimpeded and unaffected to cross over at the point 22. It is only those imperfect rays which are compressed by multiple reflections to the cone tip 14, these being effectively added to and increasing the density of the image forced in the region of the point 22. In order for the perfect rays 24 to pass through the cone 10 unaffected, the base 12 should be shaped such that the surface is normal to the rays. Those rays 26 which are not normal to this surface are thereby refracted in the proper direction so as to further improve the correction needed for guiding these rays to the tip portion 14.

The particular embodiment shown in FIG. 1 reveals that the cone 24 of light emanating from the lens 18 is of substantially the same size as the cone 10 with the peripheral rays 24 passing immediately adjacent to and parallel to the cone sides 16. The "perfect rays" from lens 18 converge onto the apex 14 without correction. However, because of the curvature of surface 12, the "imperfect rays" are corrected thereby toward the apex 14.

While the input rays to the lens 18 are, in the illustrated embodiment, diverging, they may be collimated. In this case, the curvature of the base 12 should be such as to converge the rays onto the apex 14: the lens 18 would not be necessary.

In FIG. 2, the cone 10a is hollow rather than solid and is provided on its inner wall with a reflective surface 16a of silver or the like. The base 12a of the cone is shown as defining a plane normal to the cone axis while the truncated tip 14a similarly defines a plane which is normal to the cone axis. With the lens 18 positioned adjacent to the base 12a in the same optical alignment as already explained in connection with FIG. 1, an optical image, reduced in size, of the original source will be produced in the vicinity of the cross-over 22a, or in other words adjacent to the aperture of the tip portion 14a.

Being hollow, refractive correction as already explained in the arrangement of FIG. 1 obviously is not available.

Referring to FIG. 3, the arrangement there illustrated may be considered to be substantially identical to that of FIG. 1 with the exception that the tip portion 14b is bulbous in form rather than truncated. However, this bulbous form may be regarded as a truncated tip inasmuch as it functions similarly to the tip 14 of FIG. 1 as a passive radiator. This provides a homogeneous real source of energy for subsequent use. One method of forming this tip 14b is to increase the power delivered to the filament 20 to the point that heat developed by absorption of the light energy in the apex of the cone 10 causes melting of the tip, which then forms into a bulbous shape and solidifies. This tip portion 14b in this embodiment may be regarded as the real light source. One arrangement for cooling the tip 14b and for otherwise cooling the cone 10 is shown in FIG. 3a wherein a hollow conically shaped conduit 11 of metal or the like coaxially surrounds the cone 10 in spaced relation. The conduit 11 at its upper end 13 is spaced farther away from the cone than it is at the lower end portion 15 adjacent to the apex portion 14b. Then below this end portion 15, the conduit flares outwardly into the funnel shaped portion 15a which surrounds, at least in part, the apex portion 14b. Cooling currents of air or other suitable gas are introduced into the upper end 15 of the passageway formed between the conduit 11 and the cone 10, these currents flowing downwardly past the apex portion 14b and outwardly of the funnel portion 15a. Since the volume of the funnel portion 15a is larger than the passageway adjacent to the cone in the apex region, the gas expands thereinto and cools the smaller end of the cone including the bulb 14b. In the formation of the bulb 14b, this cooling is instrumental in solidifying the same to a smaller size than would be possible in ambient atmosphere without the conduit 11.

This conduit 11 assembly obviously can be used with other cones, such as the one shown in FIG. 1 and described elsewhere, for cooling the apex portions thereof.

Referring to the arrangement of FIG. 4, the cone device 10c very closely resembles the cone 10 of FIG. 1 except for the fact that the device 10c is composed of a plurality of individual tapered elements 30 which are elongated, straight and tapered from one end to the other. As shown in FIG. 5, these elements 30 may be hexagonal in cross-section; however, any other cross-sectional shape may be used so long as the multiple reflecting features as previously described are obtained. These various elements 30 are so sized and shaped that when they are assembled together in contiguous relationship, they form the cone-shaped device 10c. When so formed, a base or light-receiving surface 12c is provided. The apices of the individual elements 30 are truncated so as to form the truncated apex portion 14c as shown. A lens 18c is positioned with respect to the device 10c in essentially the same manner as the lens 18 in FIG. 1 with respect to the cone 10, such that converging rays are directed by the individual elements 30 toward the focal point 22c. These elements 30 preferably are made of transparent quartz with the walls thereof being light-reflective. If desired, these walls may be silvered for providing the light-reflective surfaces.

While rays which are perfectly focused by the lens 18c will not strike the walls of the individual elements 30, still the imperfect rays will be randomly reflected between the walls of the individual elements and will finally emerge from the tip portions thereof in the region of the focal point 22c. The taper of the individual elements 30 is formed at essentially the same angle of convergence of the bundle of rays received by the elements, respectively. In this particular arrangement, by reason of the resulting smaller angles of incidence at which the rays strike the element walls, a greater percentage of the rays will emerge from the apex portion 14c than will be rejected. A metallic band or the like may be wrapped around the elements 30 for securing them together in compacted assembled relationship.

FIG. 6 illustrates still another cone device 10d which functionally is quite similar to that of FIGS. 4 and 5. This device 10d is composed of an assemblage of hollow conical elements 32, 34 and 36 which are radially spaced apart as shown in concentric relationship. For the purpose of securing these cones together, suitable transparent supports 38 and 40 of annular shape may be secured to the cone walls. The facing surfaces of these three cones are rendered light-reflective by means of silver coatings or by polishing, with the inner surfaces 42, 44 and 46 being provided with tapers which define angles having common apices at the point 48. Desirably, the truncated tips 48, 50 and 52 are axially spaced according to the arrangement shown. The thicknesses of the cone walls are preferably uniform from one end to the other.

With the convergent rays of the lens 18, for example, entering the upper open end of the cone device 10 in optical alignment therewith, the rays which are perfectly converged will focus on the point 47 while the imperfect rays will be forced through the various apertures in the tip portions 48, 50 and 52 by the multiple reflections between the facing cone surfaces. Thus, the rays which emerge from the tip 48 form an image source which is smaller than the original source.

Practical utilization of the various devices described thus far may be realized by incorporating certain of them in a total assemblage of the type illustrated in FIG. 7. In this assembly, a frame 54 of tubular shape, which preferably is of solid wall construction, has mounted therein a conventional parabolic reflector 56 and a conventional lamp 58 which is located at the focal point of the reflector 56. The lamp 58 may be of any conventional type, such as a quartz-jacketed halogen lamp, a standard projection lamp, or any radiant source which is acceptable for optical purposes. Also supported by the frame 54 is a planar assembly of cones 10 which are arranged in side-by-side arrangement as shown in circular array. The axes of these cones 10 are parallel to each other as well as to the axis of the reflector 56. The base surfaces 12 are directly exposed to the reflector 56 for receiving light therefrom.

Directly beneath one series of cones 10 are a series of refractive collimating elements 60 which are also arranged side-by-side in planar arrangement. There is one element 60 for each cone 10. The construction of an individual element 60 is fully disclosed in my application Serial No. 128,454, filed August 1, 1961, and preferably is formed of quartz, the same as the individual cones 10. Each element 60 preferably has the shape of a segment of a sphere. The segment is provided with two curved surfaces 62 and 64, respectively, the surface 62 being larger than the surface 64. Both surfaces are curved in the same direction as shown, the particular shapes of the curvatures of these two surfaces are such that the incident radiation received by the surface 62 is refracted into a collimated beam as will be explained more fully hereinafter.

The alternate series of cones 10 on the opposite side of the assembly axis have optically aligned therewith a like series of lenses 66 in side-by-side, coplanar arrangement. There is one lens 66 for a respective cone 10.

The cones 10 are individually supported by means of a suitable flat plate 68 which is secured to the frame 54. This plate 68 is provided with a series of suitably sized apertures into which the cones 10 are fitted. The elements 60 and lenses 66 are similarly supported in the illustrated position by means of another plate 70 having a series of suitable apertures therein which respectively receive the elements 60 and lenses 66.

The axes of the elements 60 and lenses 66 are coextensive with the axes of the respective cones 10 for reasons which will be explained more fully hereinafter.

Positioned immediately beneath the element 60 and lens 66 is a relatively large converging lens 72 suitably supported by the frame 54. This support, in the illustrated embodiment, consists of a glass or quartz plate 74 fitted at the edges thereof to the frame 54. The axis of the lens 72 is preferably coextensive with the axis of the reflector 56.

Positioned beneath the lens 72 and in axial alignment therewith is a cone device 10d as already described. A post 76 coaxially secured to the underside of the supporting disc 74 has a tapered tip portion 78 which concentrically fits inside, in radially spaced relation, the cone 36. The lower extremity of this tip 78 is terminated short of the truncated tip 54 so as to provide an exit aperture for light rays. Actually, the relationship between the tip 78 and the cone 36 is made the same functionally as that between the various cones of the device 10d.

The device 10d is conveniently supported in its coaxial position by means of a suitable, centrally apertured plate 80 which is secured at the edges to the frame 54.

Optically aligned with the device 10d is a conventional lens configuration 82 which serves to focus a light image at point 84 inside an evacuated chamber 86. This evacuated chamber as well as the lenses of the configuration 82 are secured by means of the illustrated supports to the frame 54. The end plates 88 and 90 of the chamber 86 are transparent for purposes which will be explained hereinafter.

In operation, light emitted by the lamp 58 is formed into a relatively large essentially collimated beam 92 which is directed onto the base surfaces 12 of the various disc-arranged cones 10. Since each area 12 is substantially smaller than the area of the beam 92 cross-section, it at once becomes apparent that the cones 10 receive only discrete portions of the total light reflected from the reflector 56. Thus, each individual cone may be considered as receiving a single collimated beam which is a portion of the total beam 92. By reason of the curvature of the base 12 and the refractive index of the material of the cones 10, the received light can be focused just beyond the truncated apices of the cones. This is the same as explained in connection with FIG. 1. Any of those rays which are slightly out of parallelism, or in other words are not collimated, such as the ray 94, is refracted and reflected inside the respective cone and is literally forced out of the apex toward the image point 95. Thus, the apices of each of the cones 10 may be considered as providing point-like images or light sources which contain substantially the total energy received by the respective base surfaces 12.

For the one series of cones 10, these point-like sources are located at the focal points of the compressing elements 60 such that the latter converge and compress this energy into individual collimated beams indicated by the numeral 96. With respect to the other series of cones 10, the image sources at the apices thereof are directed onto the simple lenses 66 which in turn refract the rays into collimated beams indicated by the numeral 98. These beams 96 and 98 are directed onto the focusing lens 72 which is so designed in accordance with well-known practices to focus the rays of all these beams 96, 98 toward and onto a point 100. The converging rays 102 and 104 of the beams 96 and 98, respectively, are directed through the cone spaces provided by the cone elements 32, 34 and 36 such that the perfectly converged rays cross over at point 100 and do not in any way impinge any of the cone element surfaces, but the imperfect rays reflect randomly from surface to surface until they are virtually driven to the cross-over point 100. The purpose of the cone device 10d is to guide and direct the imperfect rays toward the cross-over point 100 so as to concentrate, in a point-like region, the energy of the lamp 58. It is obvious that the point-like source 100 is substantially smaller than that of the source of light in the lamp 58.

After the source has been imaged at the cross-over point 100, it may be utilized in any desired manner and for any desired purpose. As shown, the rays from the cross-over point 100 are collimated by the lens configuration 82 and focused to a point 84 inside an evacuated chamber 86. Since it is possible to obtain extremely high power densities in the cross-over points 100 and 84, it is possible to ionize the atmosphere at such points. However, by locating the focal point 84 inside the evacuated chamber 86, this ionization can be avoided and the point source 84 may be used in any manner as may be desired. For one thing, the source 84 could be used to feed the mechanism disclosed in my application Serial No. 128,545 for the purpose of producing an intense power beam having utility for many different desired purposes.

Recapitulating, it will be seen that the cones 10 divide the total beam 92 into separated, discrete segments which are individually treated and controlled. Once these segments have been controlled and refined, the energy therein is superimposed on the area of the point 100 to provide the point source. This point source 100 possesses substantially the same energy content in a point-like region that the lamp 58 does from its relatively large area. The use of the individual cones 10 for segregating and tailoring the rays provides a means for collecting and controlling the imperfect rays which otherwise would be lost in developing the point source 100.

A slightly different embodiment of this latter concept is disclosed in FIG. 8 wherein a simple condensing lens 106 has a plurality of smaller condensing lenses 108 positioned in axially spaced relation therefrom. Tiny light sources are positioned at the focal points of the smaller lenses 108, respectively, and emit rays which are formed into the various parallel beams 112, respectively. These beams 112 are then focused by the lens 106 to the focal region 107. Since in any lense system of this character the individual filaments 110 will be imaged at 107, if unity magnification is assumed, the size of the image 107 will be the same as that of the individual sources 110. Superimposition may be produced by slightly converging the axes of the individual beams. Thus, all of the energy of the combined, same size sources 110 will be concentrated into the single image 107 thereby providing an intensely brilliant source at 107 which is of small size.

Since a single large power source imaged at unity, or at a slightly reduced size, shows no power increase in the image, this represents a terminal condition due to the physical size of the power source as well as the speed of the optics. Thus, if one of the filaments 110 were assumed to possess the power of one kilowatt, and this was the only filament operating, then the image formed at 107 could not contain any more than one kilowatt in about the same size area. Known techniques would not permit the appreciable reduction in size of this image 107 for the purpose of increasing the power density at the point. However, when the other sources 110 of the same size are added to the first source, it is seen that the power developed in the region 107 in an area of the same size as the individual sources 110 is multiplied. In the illustration of FIG. 8, since there are five filaments, five times the power would be available in the region 107. The smaller the image 107 can be made, the higher the power density.

Now, if it is considered that, for example, a 5-kilowatt filament occupies a size five times as large as one of the individual filaments 110, the image produced at the focal point 107 of the 5-kilowatt source would be of the same size as the source. The power density, therefore, would not be any greater than at the source itself. However, by considering that this 5-kilowatt source is divided into five segments, each segment being one kilowatt each and of one-fifth the size as the original, then it is seen that this total power of 5-kilowatts can be concentrated into an extremely small area as denoted at 107. Obviously, the smaller the radiation sources can be made, the more perfect is the collimation between lenses and the smaller the image point.

While I have described above the principles of my invention in connection with specific apparatus, it is to be clearly understood that this description is made only by way of example and not as a limitation to the scope of my invention.

What is claimed is:

1. Apparatus for reducing the optical size of a source of light comprising a source of light, light-transmitting cone means having a base and an apex portion, the cross-sectional dimensions of said apex portion being smaller than the cross-sectional dimensions of said source of light, said cone means having an outer wall, the inner surface of said wall being light-reflective, source means for providing a bundle of converging rays of light from said source of light and for directing said bundle onto the base of said cone means, the axis of said convergent bundle being substantially coincident with the axis of said cone means, the angle of convergence of said bundle being such as to cause said rays to cross-over in the region of said apex portion, said source means also providing rays which are transmitted through said cone means to said apex portion by multiple internal reflections from said inner surface thereby adding the energy of the last-mentioned rays to the energy of the rays which converge onto said apex portion.

2. Apparatus for reducing the optical size of a source of light comprising a source of light, light-transmitting cone means having a base and an apex portion, the cross-sectional dimensions of said apex portion being smaller than the cross-sectional dimensions of said source of light, said cone means having an outer wall, the inner surface of said wall being light-reflective, source means for providing a bundle of converging rays of light from said source of light and for directing said bundle onto the base of said cone means, the axis of said convergent bundle being substantially coincident with the axis of said cone means, said bundle substantially filling said cone means, the angle of convergence of said bundle being such as to cause said rays to cross-over in the region of said apex portion, the rays of said bundle adjacent to said inner wall surface being substantially parallel thereto, said source means also providing rays which are transmitted through said cone means to said apex portion by multiple internal reflections from said inner surface thereby adding the energy of the last-mentioned rays to the energy of the rays which converge onto said apex portion.

3. The apparatus of claim 1 wherein said cone means comprises a cone shaped element of a material denser than air, said base having a surface of predetermined shape, said base surface shape, said source means and the index of refraction of said element being such as to form said angle of convergence of said bundle internally of said element.

4. The apparatus of claim 1 wherein said cone means comprises a cone shaped element of a material denser than air, said base having a surface of predetermined shape, said base surface shape, said source means and the index of refractiton of said element being such as to form said angle of convergence of said bundle internally of said element, said apex portion being of bulbous form and located at the point of cross-over.

5. The apparatus of claim 2 wherein said cone means is hollow and said inner surface is cone-shaped, the apex portion of said cone means being truncated thereby providing an aperture through which said rays emerge, said aperture being smaller in size than said source of light.

6. Apparatus for reducing the optical size of a source of light comprising a source of light, a light-transmitting cone having a truncated apex and a base surface, said base surface having a predetermined convex shape, said cone being composed of a material transparent to light, said material having a predetermined index of refraction, the wall of said cone being light-reflective, an imperfect source of light optically aligned with respect to the axis of said cone, said source being disposed to irradiate said convex base surface at a given angle of incidence, said angle of incidence, said convex shape and said index of refraction being related such that light from said source is internally convergently transmitted through said cone toward the cone apex with the peripheral rays thereof being substantially parallel to the cone wall, the cross-sectional dimensions of said apex being smaller than the cross-sectional dimensions of said source of light.

7. Apparatus for reducing the size of a source of light comprising an extended area source of light, means for forming light emitted by said source into a beam of collimated rays, means for dividing said beam into a plurality of bundles of converging light rays, means for forming said plurality of bundles into a plurality of second beams of collimated rays, and means for converging said second beams and the rays therein toward a common point for providing a secondary light source of smaller size than that of said extended area source.

8. Apparatus for reducing the size of a source of light comprising an extended area source of light, means for forming light emitted by said source into collimated and noncollimated rays having the same general direction of propagation, means for dividing said rays into a plurality of bundles of converging rays having point-like regions of convergence, respectively, means for forming said plurality of bundles into a plurality of beams, respectively, means for converging said beams and the rays therein toward a common point, and means for correcting the convergence of certain of the last-mentioned rays which otherwise would deviate from said point.

9. Apparatus for reducing the size of a source of light comprising a supporting frame, a parabolic reflector mounted on said frame, an extended area source of light positioned in registry with the focus of said reflector whereby rays reflected from said reflector will be substantially collimated, a plurality of light-compressing cones having light-receiving bases and light-transmitting apices, respectively, said cones being positioned on said frame in optical alignment with said reflector, the axes of said cones extending substantially parallel to the direction of the collimated rays reflected from said reflector, collimating-lens means supported by said frame and positioned to receive light rays from said apices for producing a plurality of individual parallel beams, a converging lens for receiving said parallel beams and for converging the rays thereof toward a cross-over point, and means interposed in the paths of said converging rays for correcting the convergency of certain of the last-mentioned rays which otherwise would deviate from said cross-over point.

10. The apparatus of claim 9 wherein said correcting means comprises a plurality of radially spaced concentrically positioned hollow cone-like elements having truncated apices, said elements having facing wall surfaces which are light reflective, the projected imaginary apices of the inner wall surfaces of said elements being substantially coincident.

11. Apparatus for reducing the optical size of a source of light comprising a light-transmitting cone having a truncated apex and a base surface, said base surface having a predetermined convex shape, said cone being composed of a material transparent to light, said material having a predetermined index of refraction, the wall of said cone being light-reflective, an imperfect source of light optically aligned with respect to the axis of said cone, said source being disposed to irradiate said convex base surface at a given angle of incidence, said angle of incidence, said convex shape and said index of refraction being related such that light from said source is internally convergently transmitted through said cone toward the cone apex with the peripheral rays thereof being substantially parallel to the cone wall, a conduit coaxially surrounding and being spaced from said cone for providing a passageway, said conduit extending to a region adjacent to said apex and flaring away from said apex to provide an expansion chamber in the vicinity of said region, said chamber being of larger volume than said passageway in the portions thereof which surround the apex portion of said cone, and means for forcing gas through said passageway from the larger diameter portions thereof, past the apex and outwardly of said expansion chamber whereby said apex may be cooled.

12. Apparatus for reducing the optical size of a source of light comprising light-transmitting cone means having a base and an apex portion, said cone means comprising a plurality of radially spaced concentrically positioned hollow cone-like elements having truncated apices, said elements having facing wall surfaces which are light reflective, the projected imaginary apices of the inner wall surfaces of said elements being substantially coincident, means for securing said elements in assembled relation, the smaller diameter ends of said elements being spaced along the axis of said cone means with the smaller ends of the inner elements being progressively axially spaced inwardly from the smaller end of the outermost element.

References Cited by the Examiner

UNITED STATES PATENTS

| 838,950 | 12/1906 | Coger et al. | 240—47 X |
|---|---|---|---|
| 1,410,864 | 3/1922 | Woolley | 240—41.3 X |
| 1,717,234 | 6/1929 | Lentini. | |
| 2,063,744 | 12/1936 | Kramer. | |
| 2,604,005 | 7/1952 | Hahn | 240—46.53 X |
| 2,830,175 | 4/1958 | Janhsen | 240—46.41 |
| 2,931,027 | 3/1960 | Belfary et al. | |
| 2,981,826 | 4/1961 | Mattern. | |
| 2,992,587 | 7/1961 | Hicks et al. | |
| 3,090,831 | 5/1963 | Schepler. | |

FOREIGN PATENTS 536,887 5/1963 Great Britain.

NORTON ANSHER, *Primary Examiner.*

C. R. RHODES, *Assistant Examiner.*